United States Patent [19]

Frank et al.

[11] Patent Number: 5,252,952
[45] Date of Patent: Oct. 12, 1993

[54] CURSOR DEVICE WITH ZERO-POINT RESETTING

[75] Inventors: Manfred Frank, Grosshadersdorf; Gunter Murmann, Pegnitz, both of Fed. Rep. of Germany

[73] Assignee: The Cherry Corporation, Waukegan, Ill.

[21] Appl. No.: 744,363

[22] Filed: Aug. 13, 1991

[30] Foreign Application Priority Data

Oct. 26, 1990 [DE] Fed. Rep. of Germany ......... 4034166

[51] Int. Cl.$^5$ .............................................. G09G 1/00
[52] U.S. Cl. .................................... 345/157; 345/168
[58] Field of Search ....................... 340/706, 709, 711; 200/6 A; 74/471 XY

[56] References Cited

U.S. PATENT DOCUMENTS

| | | | |
|---|---|---|---|
| 4,093,953 | 6/1978 | Hammons et al. | 74/471 XY |
| 4,127,841 | 11/1978 | Kato et al. | 74/471 XY |
| 4,489,304 | 12/1984 | Hayes | 74/471 XY |
| 4,587,510 | 5/1986 | Kim | 74/471 XY |
| 4,590,454 | 5/1986 | Zettergren | 74/473 R |
| 4,670,743 | 6/1987 | Zemke | 74/471 XY |
| 4,782,327 | 11/1988 | Kley et al. | 340/365 |
| 4,935,728 | 6/1990 | Kley | 340/709 |
| 4,949,080 | 8/1990 | Mikan | 340/709 |

FOREIGN PATENT DOCUMENTS

3301156A1 7/1984 Fed. Rep. of Germany.
3830933C1 10/1989 Fed. Rep. of Germany.
3832459A1 2/1990 Fed. Rep. of Germany.

*Primary Examiner*—Ulysses Weldon
*Assistant Examiner*—Gin Goon
*Attorney, Agent, or Firm*—Willian Brinks Olds Hofer Gilson & Lione

[57] ABSTRACT

A cursor control device moves from a precise zero rest position to define x-y coordinates for moving a cursor on a computer screen. When an actuating force is removed, the deflected control device is precisely returned to its zero rest position by operation of springs. The device provides relative cursor position data by reference to the zero rest position. The position data is converted to electrical signals which are utilized to position the cursor on the screen.

12 Claims, 7 Drawing Sheets

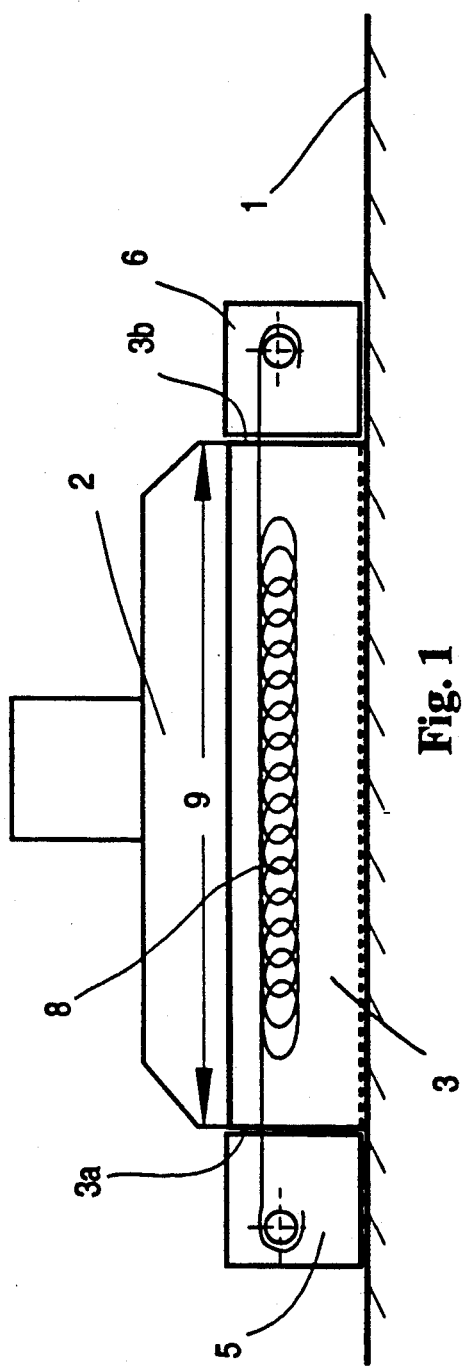
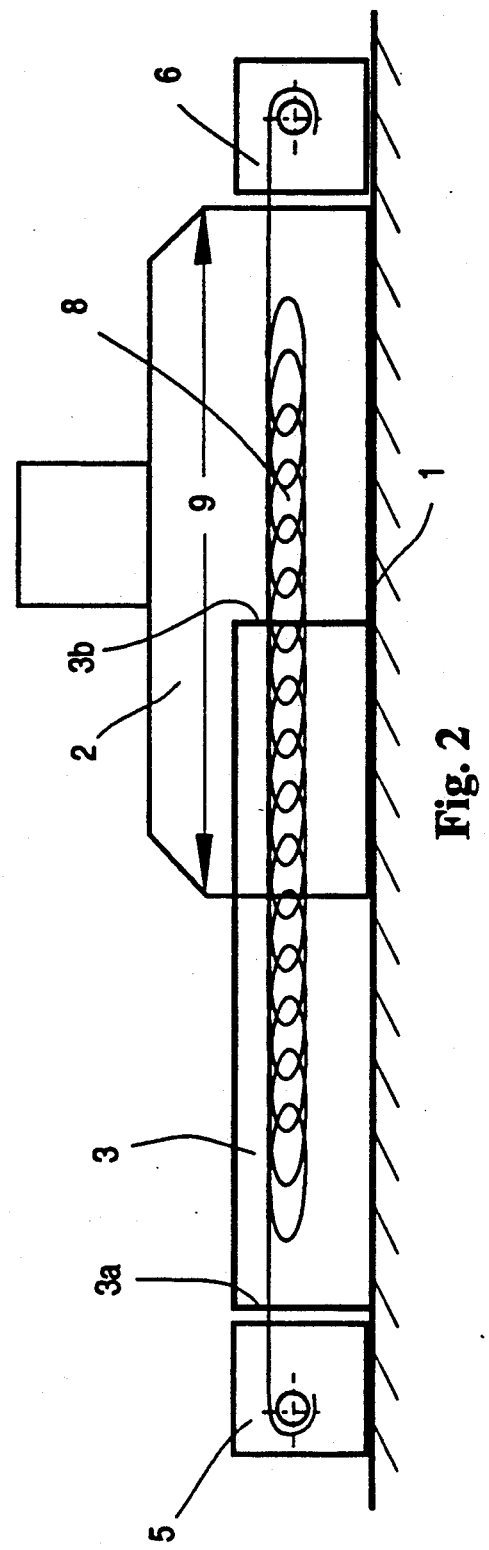
Fig. 1
Fig. 2

CURSOR DEVICE WITH ZERO-POINT RESETTING

TECHNICAL FIELD

The invention relates to a cursor control device for a computer and, more particularly, to such a cursor control device which employs a zero-point resetting feature.

BACKGROUND OF THE INVENTION

Computers typically use an input device known as a "mouse" which determines the position of a pointer or cursor of a display screen. The mouse is guided over a flat surface in order to define a corresponding movement for the cursor on the screen. In operation, changes of x and y coordinates corresponding to movement of the mouse are sent to the computer by a cable or alternatively by an optical remote control. The computer calculates the position of the cursor or pointer on the screen and forms an image of the cursor at the defined position.

Known mouse cursor controls have the disadvantage of requiring space in addition to the space already occupied by the computer and the keyboard. Also, the required continuous back and forth movement of the hand between the keyboard and the mouse is not ergonomic.

For this reason, attempts have been made to integrate mouse-like units into a computer keyboard. For example, PCT Publication No. WO86/04166, published Jul. 17, 1986, U.S. Pat. No. 4,782,327, issued Nov. 1, 1988 to Kley et al., and U.S. Pat. No. 4,935,728 issued Jun. 19, 1990 to Kley disclose such a cursor control device. The disclosed device addresses many points within a distance of travel of a few centimeters. The precision required to position the cursor in this device is greater than can be easily achieved by the supplied manual cursor positioning device.

A cursor may be relatively precisely positioned if changes in the position of the cursor are addressed in a relative rather than an absolute manner. This can be achieved if the positioning element for the cursor has a defined zero position to which it automatically returns after a cursor position adjustment and from which the next relative position change of the cursor positioning element is started. The publication No. WO 86/04166 describes how such a positioning element can be mechanically pulled back to a zero or origin position by springs. In the disclosed device a positioning element is suspended by diagonal springs on the housing of an input unit. However, it is known from classical mechanics that elements coupled to springs are not returned to a precise zero or origin position, but oscillate about the zero position. Although this oscillation can be suppressed by damping or friction, if the friction or damping is too great the element is not consistently returned to the same zero point. Thus, in such a system the location of the zero rest position depends upon the initial conditions of the system, for example the initial direction and velocity of the positioning element when it is released. It is therefore desirable to provide a cursor positioning device which can be precisely reset to a zero point to allow relative cursor position addressing, without undesirable oscillations of the cursor position control. It is also desirable to provide such a mechanism which blocks the entry of dust or other debris into the cursor positioning mechanism.

It is an object of the invention to provide a movable cursor positioning element with a precise zero position from which it moves with reduced friction and with accuracy in response to an actuating force, the movement from the zero position being accurately represented by computer processed electrical signals. It is a further object to provide such a device which returns to its zero position in a consistent and precise manner, without oscillation, when the actuating force is removed.

SUMMARY OF THE INVENTION

In order to achieve the objects of the invention and overcome the problems of the prior art, the improved cursor positioning device of the invention optoelectronically converts movement of a positioning element to light pulses which are counted to determine relative movement. In operation, the pulses are generated by light gratings or lineals which are mounted to move as the positioning element moves. The moving lineals interrupt light beams and therefore generate light pulses to indicate the degree of movement.

The moveable parts of the device are guided on rails in order to provide a relatively easy and accurate motion. The device is controlled by an integrated four key actuator which provides the familiar stepwise adjustment in cursor position which is provided by known keyboards with separate cursor control keys.

The cursor control mechanism is protected from dirt and debris by relatively simple overlapping cover components and the device is integrated into the keyboard to facilitate its operation.

The advantages and features of the invention will be apparent from the following description in conjunction with the claims and drawings, wherein:

BRIEF DESCRIPTION OF THE DRAWINGS

FIG. 1 is a schematic side elevation view illustrating the cursor control device of the invention at its zero rest position.

FIG. 2 is a schematic side elevation view of the apparatus of FIG. 1, with the cursor control device moved from its zero position.

FIG. 8b is a side elevation view of the actuating element of FIG. 8a.

DETAILED DESCRIPTION OF PREFERRED EMBODIMENTS

Figure 3:
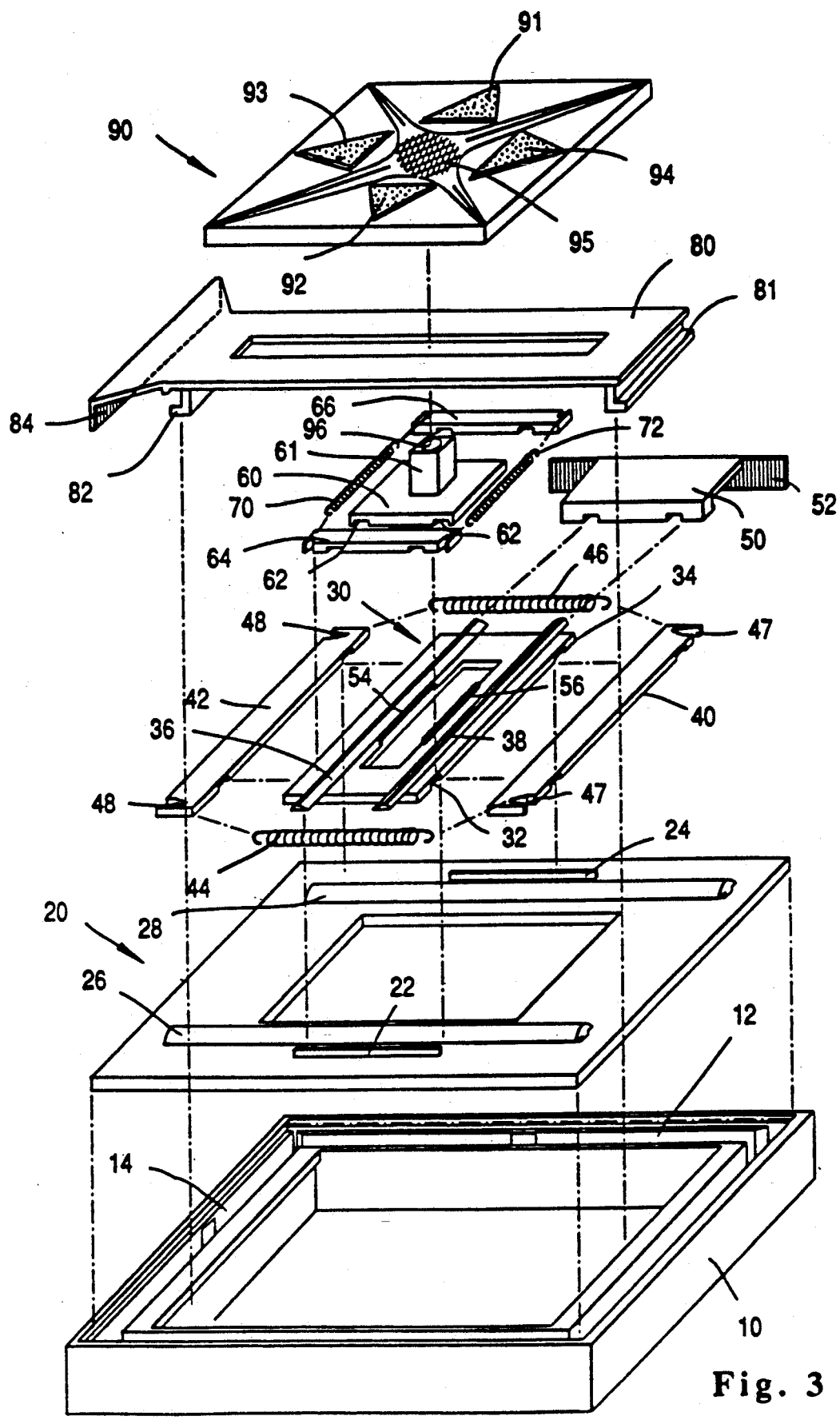
FIG. 3 is an exploded view of a cursor device according to the invention in which the mechanism shown in FIGS. 1 and 2 is used to provide two directions of movement.

FIGS. 1 and 2 show schematically the mode of operation of a mechanism for zero-point resetting in accordance with an embodiment of the invention. A movable positioning element 2 is disposed on a plane 1. The positioning element 2 is shown in its rest position in FIG. 1. In operation, as shown in FIG. 2, the element 2 is moved laterally and the relative lateral movement is converted in a conventional manner, for example, by light emitting diodes and associated optoelectronic sensing elements, to electrical signals which are applied to an input of a cursor control processing system.

The zero position of the device of FIGS. 1 and 2 is defined by engagement of bar members or webs 5 and 6 of the device against the ends of a stop element 3. As shown in FIG. 1, in the zero position a spring 8 draws the two movable webs 5 and 6 toward each other and against the ends of the stop element 3. The end faces of the stop element 3 define stop positions 3a and 3b beyond which the webs 5 and 6 cannot move. The positioning device is thus in its zero position when the two webs 5 and 6 are pulled by the force of the spring against the ends of the stop element 3 at the stop positions 3a and 3b.

As shown in FIG. 2, when the positioning element 2 is moved to the right by a manually applied actuating force, the spring 8 is extended and the web 6 is moved away from its stop position 3b. The force of the spring 8 holds the web 5 in position at the stop position 3a and biases the web 6 back toward the stop element 3 for as long as the actuating force is applied.

When the positioning element 2 is released, it is pulled back to the zero position of FIG. 1 by the force exerted by the spring 8 and applied by the web 6. The element 2 therefore snaps back to its rest position with the web 6 pressed by the spring 8 against the end face of the stop element 3 at the position 3b.

Upon reaching the zero position the mechanism of the invention operates in an advantageous manner which is different in a kinematic sense from the operation of the known spring operated cursor device. In the known device the energy stored in the return spring is converted primarily into kinetic energy upon release and return of the positioning element. This operation results in oscillation of the returning element beyond its zero point. If the spring operated mechanism is changed to provide increased friction, a large part of the return release energy will be converted to heat and oscillations will therefore be damped. However, the coefficient of static friction is greater than the coefficient of sliding friction, and therefore an increased friction spring mechanism will not be consistently returned to a precise zero position.

In contrast, the mechanism of the invention divides the kinetic energy of the return between the two webs 5 and 6 and the positioning element 2. Undesirable oscillations might be expected with this mechanism because the potential energy of the spring is converted to kinetic energy and there is little friction. However, due to the construction of the apparatus of the invention, the positioning element must necessarily remain stationary between the defined stop positions and the kinetic energy is therefore absorbed by oscillation of the webs alone. Moreover, impulse or linear momentum is taken up by the stop element 3. The positioning element is thus precisely returned to its rest position in desirable low friction operation and oscillations of the webs do not change this position.

In accordance with the invention, the positioning element is quickly returned to its zero position without requiring any position-altering increased friction. Also, the zero position is well defined by the stops and therefore the positioning element is consistently and precisely returned to its zero or rest position. The width 9 of the positioning element 2 is equal to the distance between the stop positions 3a and 3b. Accordingly, there is no inaccuracy in the zero return position due to play in the positioning elements.

It is desirable to mechanically couple the positioning element with a device which converts the change in position to electrical signals. This connection must be made in a manner which reduces friction and inertia, in order to ensure that the desirable kinematic operation is not disturbed. This can be done by affixing and moving a light lineal or grating with the positioning element. Light lineals or gratings have spaced opaque and transparent portions which respectively block and pass light. Light lineals or gratings move with the positioning element through a light beam which may be provided by a light emitting photodiode and light detecting phototransistor. The number of interruptions of the beam by the moving lineal indicates the distance over which the positioning element and its affixed lineal move. It is known that photodiode/phototransistor pairs may be positioned to detect movement of lineals in directions oriented at 90°, so that a signal combining the signals of the pairs will indicate the direction of movement or x-y coordinates of a change in position of the positioning element.

FIG. 3 shows how two of the mechanisms described in FIGS. 1-2 operate in a cursor device to generate corresponding electrical signals for two independent directions of movement. As shown in FIG. 3, the entire mechanism is mounted in a housing frame 10. The frame has grooves 12 and 14 at its outer sides. Within each groove is at least one light emitting photodiode which directs a beam of light transverse to the groove to a corresponding phototransistor (not shown). Light lineals or gratings 52 and 84 are guided in the grooves. A planar base plate 20 having associated stop elements 22, 24 for one direction of movement lies in the frame of the housing. In addition, rails 26 and 28 are provided to guide elements corresponding to the webs and the positioning element of FIGS. 1 and 2.

A carriage 30 has grooves 32 and 34 which slide along the rails 26 and 28. The carriage 30 corresponds to the positioning element described in FIGS. 1 and 2. The function of the webs 5 and 6 of FIGS. 1 and 2 is provided by the webs 40 and 42 of FIG. 3. Springs 44 and 46 are engaged in notches 47 and 48 of the webs 40 and 42 and press the webs against corresponding end faces of the stop elements 22 and 24. As described for FIGS. 1 and 2, the carriage 30, serving as the positioning element, is enclosed by the webs 40 and 42. The light lineal or grating 52 is connected by a holder 50 to the carriage 30 and, when the carriage 30 moves along the rails 26 and 28, the light lineal or grating is moved within the groove 12. When the carriage 30 is displaced, the light lineal or grating 52 periodically interrupts the light beam directed transversely across the groove and detected, for example by at least one photodiode/phototransistor pair (not shown). The phototransistor detects the interruptions of the light beam of the photodiode and generates corresponding signals which are counted by a counter (not shown) to indicate the distance of relative movement of the carriage along the rails 26 and 28.

Rails 36 and 38 are positioned on the carriage 30. These rails define a movement which is orthogonal to the movement defined by the rails 26 and 28. The rails 36 and 38 also guide movable parts of the mechanism which has been described in connection with FIGS. 1 and 2. The rails 36 and 38 and the associated mechanism permit a second independent direction of movement for a cursor positioning element 60. Stop elements for this mechanism are provided by raised carriage portions 54 and 56. The positioning element 60 rests with its grooves 62 on the rails 36 and 38. Two opposite webs 64 and 66 also slide on the rails 36 and 38. The webs 64 and 66 are pulled towards each other by springs 70 and 72 so that they press against the ends of the stop elements 56 and 54 of the positioning element 60.

An upper carriage 80 is disposed above the positioning element 60. The carriage 80 is engaged with the positioning element and its guides 81 and 82 engage the housing frame 10. The light lineal or grating 84 is mounted on an edge of the upper carriage 80. The light lineal is engaged inside the guide groove 14 of the housing 10 to interrupt a light beam passed between at least one photodiode/phototransistor pair (not shown) disposed within the groove. The lineal or grating 84 operates in the same manner as the light lineal 52 to detect a change of position in a direction orthogonal to the direction of the change in position detected by the light lineal 52.

As shown in FIG. 3, the positioning element 60 can be moved within the entire inner region of the housing frame 10. Movement is allowed in two independent coordinate directions which are defined respectively by the rails 26, 28 and 36, 38. The two light lineals or gratings 52 and 84 and associated electronic light detecting and signal counting elements optoelectronically convert movement in the two coordinate directions into electrical pulses. From this information two numerical values are electronically formed and represent the relative x and y position of the deflected positioning element. When the deflected positioning element is released, it is pulled back under the spring force provided by the springs 44, 46, 70 and 72 to a zero set position which is defined by the ends of the stop elements 22, 24, 54 and 56.

A separate control key element 90 may be mounted on the positioning element 60 to provide a convenient cursor operation. As shown in FIG. 3, the control key element 90 is pushed onto and supported on the positioning element 60 by an actuating pin 61. The element 90 includes in addition four keys 91, 92, 93 and 94 which are associated with four different directions of movement and allow an additional stepwise control of the cursor movement independent of the cursor operation due to the optoelectronic control in response to the sliding movement of the cursor control. A finger depression 95 is provided at a central position to allow easy operation of the control element.

Figure 4:
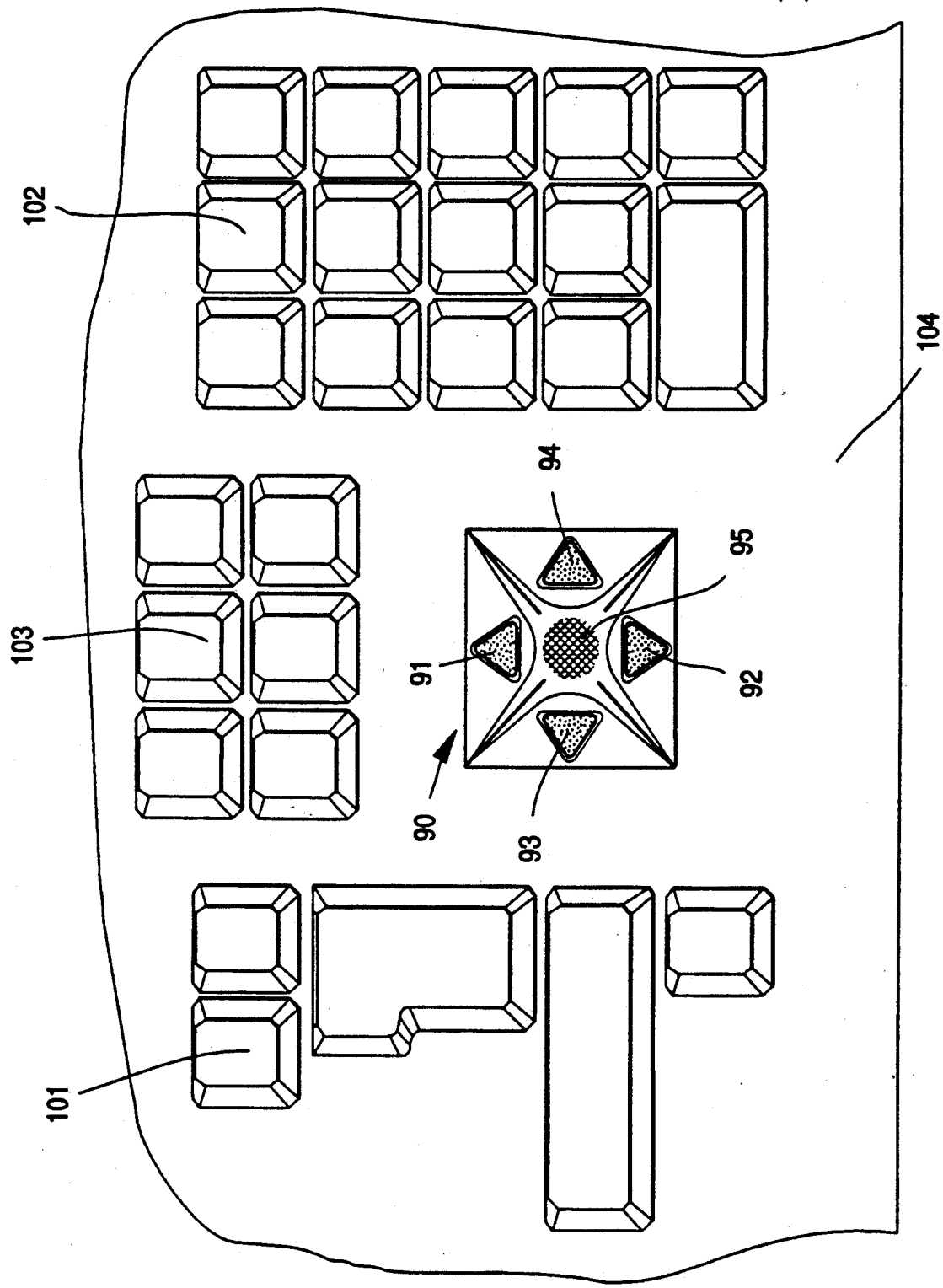
FIG. 4 shows a partial plan view of a keyboard into which the cursor device of FIG. 3 is incorporated.

FIG. 4 shows a portion of a keyboard into which the cursor device according to FIG. 3 is incorporated as a coordinate generator for a cursor control. An alphanumeric key block 101 is shown on the left side of the keyboard. A numerical key block 102 is shown on the right side. Between these two key blocks 101 and 102 is a keyblock 103 which has special function keys for controlling the computer screen. Only the control element 90 is visible above a cover plate 104 of the keyboard housing. The cursor positioning apparatus is located below the cover plate 104.

In commercially available keyboards, four keys are provided to control up, down, left and right movement of a cursor between alphanumeric characters displayed on a screen. The four keys 91, 92, 93 and 94 contained on the control element 90 can provide a similar familiar pixel-to-pixel or character-to-character movement of the cursor on the screen. Thus, the four keys can move the cursor from pixel-to-pixel in a graphics display mode and from character-to-character in a text edit mode. A control with keys 91, 92, 93 and 94 could therefore be used to move the cursor between alphanumeric characters or between pixel elements.

Figure 8B:
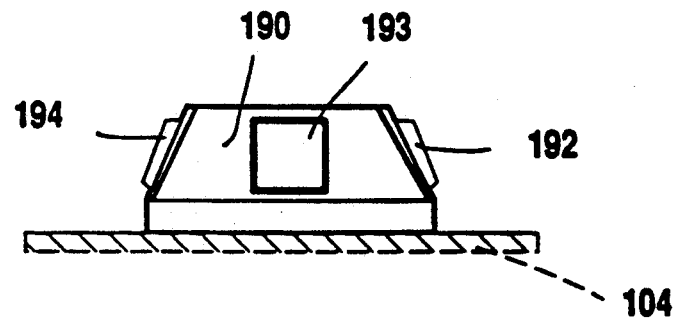
Figure 8A:
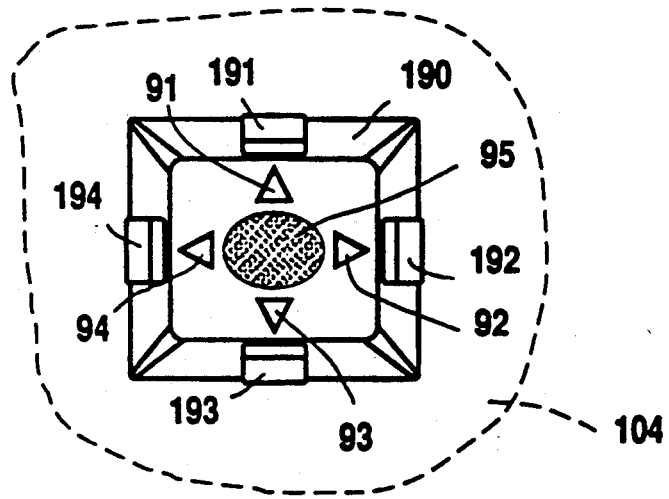
FIG. 8a is a top elevation view of the actuating element for the cursor control.

In an alternative embodiment according to FIG. 8a and FIG. 8b, which shows front and top views of a control element 190, cursor keys 91, 92, 93 and 94 are arranged on the surface of the control element 190, and function keys 191, 192, 193 and 194 are located on bevelled end sides of the control element. In such a construction a favorable ergonomic operation is achieved, if it is desired to actuate function keys either in combination with a continuous or stepwise movement of the control element, for example to set special marks or to provide special functions on the screen in relation to a cursor position.

In operating the cursor device, a finger is placed in the depression 95 and the control element is moved by slight pressure in a desired direction. Corresponding changed position values are reported to the computer and the computer calculates the actual cursor position from these values. When the control element 90 is released, it snaps back to its defined zero position so that for each new operation a predefined reference zero start point is provided. In another embodiment the cursor control can be integrated into a housing separate from a keyboard connected to a computer or terminal.

Figure 5:
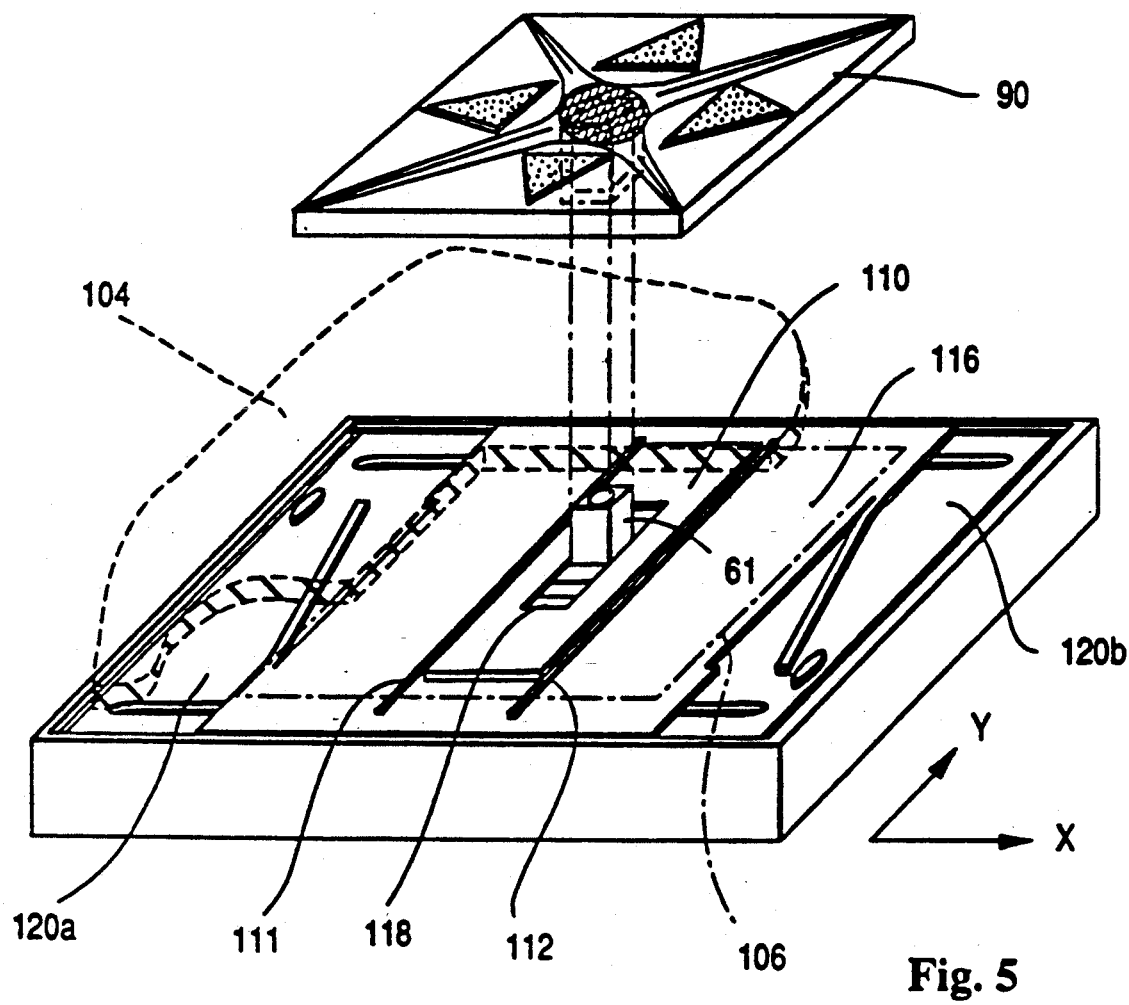
FIG. 5 is a perspective view of the cover parts of the device of FIG. 3.
Figure 6:
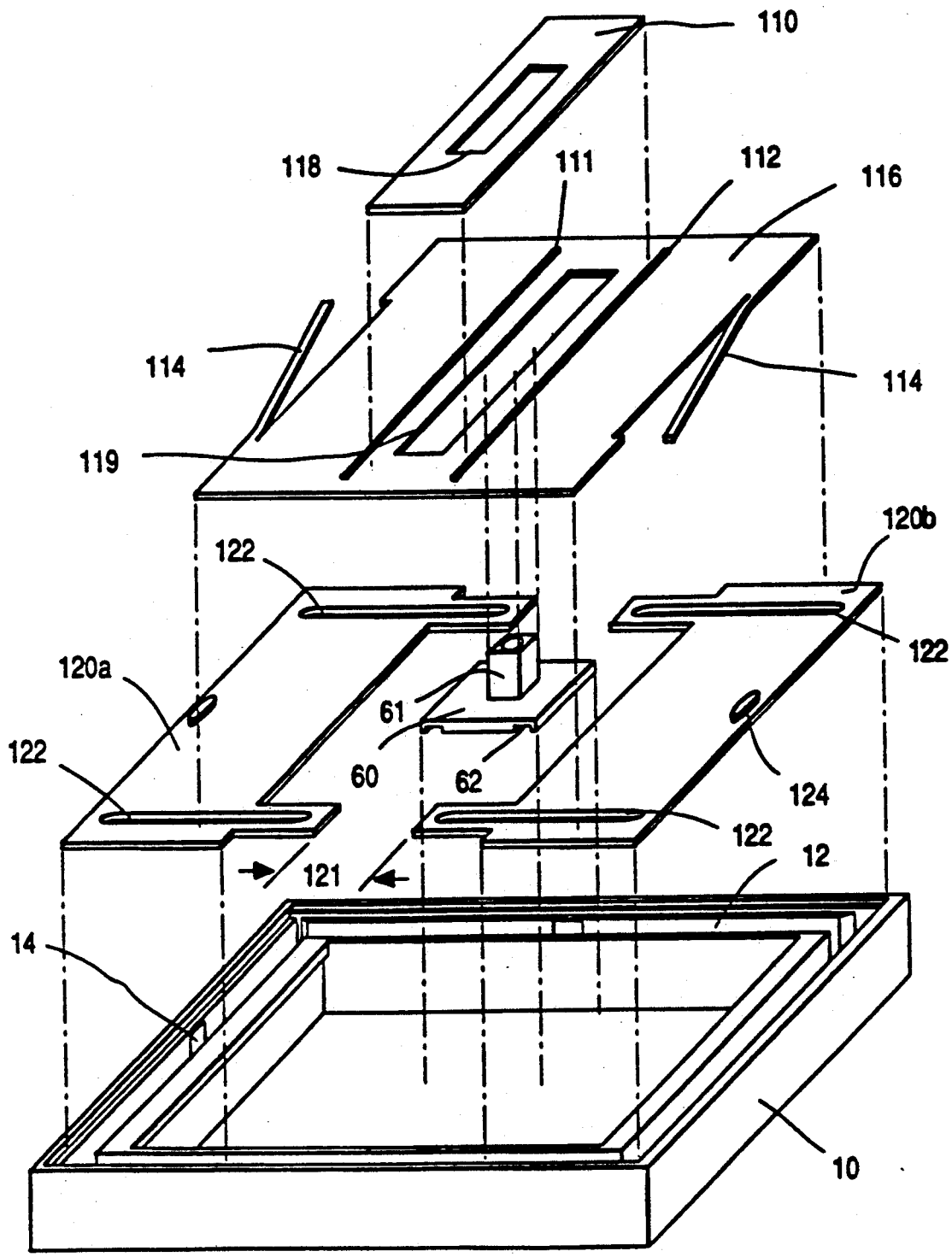
FIG. 6 is an exploded view of the cover components of the cursor device of FIG. 5.

In order to provide an attractive design and to also protect the interior of the apparatus from dirt or debris, it is desirable to cover the cursor device in the region of the cutout in the keyboard housing. As shown in FIG. 5, the cutout in the keyboard housing 104 must be relatively large to avoid obstructing the movement of the actuating pin 61 of the cursor control. In the simplest design of the cover, the control element 90 may be made sufficiently large to cover the cutout. However, this design requires a relatively large space for installation and makes it necessary to provide an additional protecting cover. As can be seen from FIGS. 5 and 6, covering displaceable plates may be used to provide enhanced protection from debris. As shown in FIGS. 5 and 6, the cover of an embodiment of the invention is divided into three planes. A cover for displacement in the y direction is provided substantially in the upper and center plane with the aid of a cover portion 110 and an intermediate part 116. A cover for displacement in the x direction is provided at the center plane by the intermediate portion 116 and at a lower plane by two edge cover portions 120a and 120b.

The top cover part 110 is guided between guide rails 111 and 112 which are formed on the intermediate part 116. In operation, movement of the actuating pin 61 in the y direction slides the part 110 within the rails 111 and 112 but does not move the part 116. The part 116 is moved only by movement of the actuating pin 61 in the x-direction.

The top cover part 110 is slidingly retained so that the length of the cutout 118 within which the actuating pin 61 moves is substantially smaller than the total length of movement of the actuating pin 61 along the y-axis. A complete closure against dirt or other debris is provided because the control element 60 completely covers the underside of the slot 118 and the cover portion 110 covers the portions of the slot 119 outside the slot 118 in all positions of the actuating pin 61.

Shielding and closure with respect to movement in the x direction is provided by the intermediate cover and a cover provided in a lower plane. For this purpose edge cover portions 120a and 120b in a lower plane expose a rectangular area allowing movement of the actuating pin 61 in the x direction. The intermediate part 116 may be made sufficiently large in the x direction so that this rectangular area is covered. However, complete coverage by the cover 116 may not always be possible because, when the intermediate part 116 is too large, complete movement in the x direction may be blocked by the side portions of the frame of the housing 10. This problem can be overcome if the lower housing parts 120 a-b do not quite fill the housing frame 10 and if the parts are retained over a desired area of travel by the intermediate part 116. As shown in FIG. 5, the edge of the opening must be covered by the cover plate 104 of the keyboard housing. As shown in FIG. 6, the required retention can be effected by slots 122 in the lower parts 120 a-b into which studs (not shown) on the lower side of the intermediate part 116 are engaged and retained.

FIG. 6 illustrates the edge cover portions 120a and 120b of the lower plane with an intermediate space 121 that provides additional play for shifting the cover. The engagement of the studs and slots 122 serve to retain the lower cover portions 120a and 120b when the intermediate part 116 is moved in the y direction. The resulting open space between the frame of the housing 10 and one of the portions 120a or 120b is covered by the cover plate 104 of the keyboard. The intermediate part 116 is provided with springs 114 which engage projections 124 at the edges of the cover portions 120a and 120b. This construction ensures that the lower cover portions 120a and 120b are held apart to provide as complete a closure as possible. It should be appreciated that the lower cover portions 120a and 120b are pushed together when one of them is pressed against a side wall of the housing and the portions are pushed apart by the springs 114 to provide a maximum size cover when the cover portions move away from the wall of the housing.

The cover parts should move easily with respect to each other and thereby minimize the frictional forces acting on the positioning element, even though precise and reliable return to the zero rest position could be achieved by using a sufficiently large spring return force to overcome such frictional forces. A relatively easy low friction sliding movement is desirable because it facilitates operation of the control element. Accordingly, all cover parts should have adequate clearance to allow relatively easy movement.

Figures 7A, 7B:
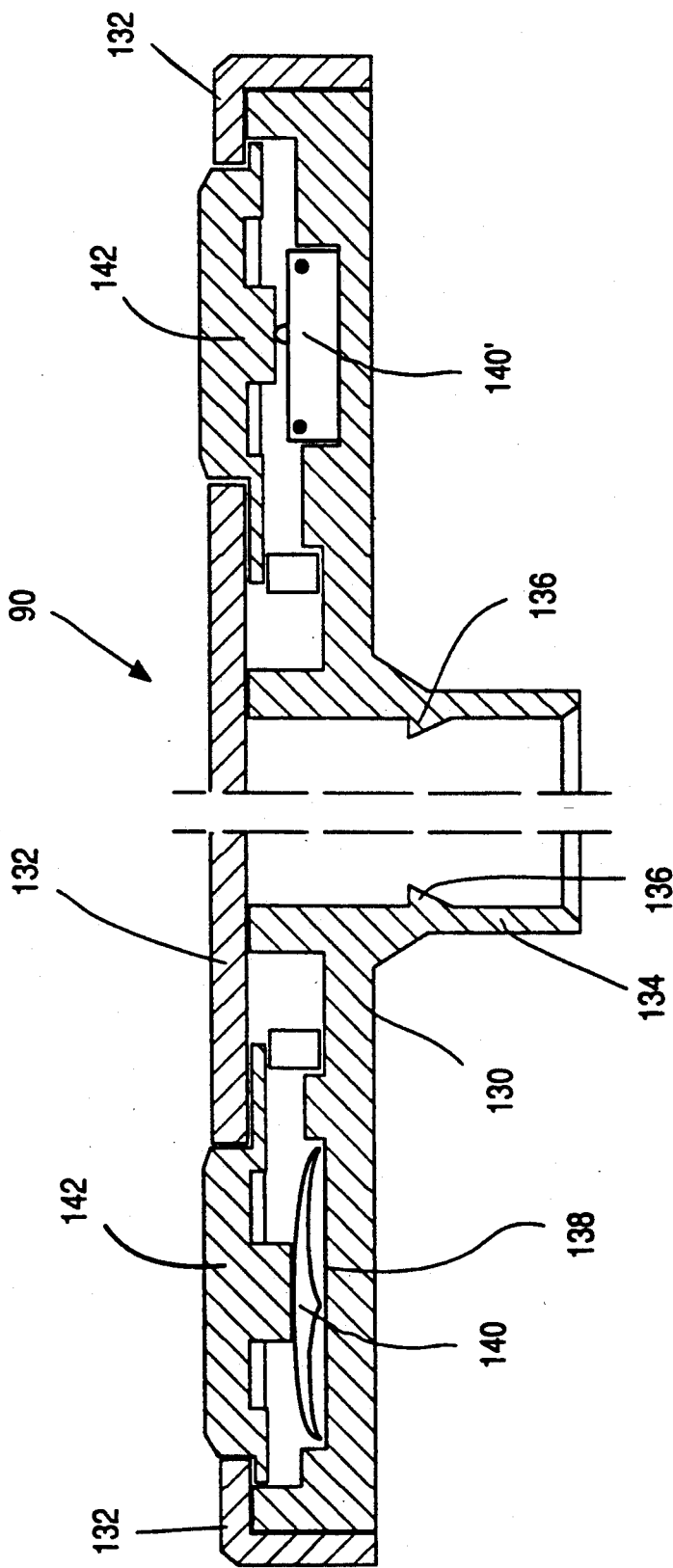
FIG. 7a is a partial cross-sectional view of one embodiment of an actuating element for the cursor control.
FIG. 7b is a partial cross-sectional view of another embodiment of an actuating element for the cursor control.

FIGS. 7a and 7b illustrate two alternative embodiments of a control element 90. As shown in FIG. 7a, the control element has a lower housing 130 and a cover 132. Formed on the lower housing is an insert pin 134 which engages the actuating pin 61 with fixed detents 136. Electrically conducting switch foils 138 are disposed within the lower housing 130. Corresponding electrically conducting snap discs 140 are spaced above the foils 138 to provide a switch for each of the keys 91-94. The snap discs are actuated by switch keys 142 disposed in the cover 132. The cover 132 holds the keys, snap discs and the lower housing 130 together.

A somewhat different embodiment of the key switch is illustrated in the partial cross-sectional view of FIG. 7b. Microswitches 140' are used to provide a switching function in response to actuation of associated switch keys 142. The microswitches can be used if a particularly pressure sensitive key switch is desired.

In the embodiments of FIGS. 7a and 7b, electrical wires for the keys 91-94 are routed through the center shaft 134. Additional connections between the keys and associated electronic circuitry disposed in the key housing are made through a hole 96 of the positioning element 60, as shown in FIG. 3.

The cursor control device illustrated in the drawings allows stepwise shifting of the cursor by the keys 90-94 in the manner of present day keyboards. However, the control also permits functions which have heretofore been possible only by using a separate mouse control. Moreover, it should be appreciated that a cursor control element integrated into a keyboard has the advantage of not requiring any additional space. This makes the installation of such a control element particularly desirable for portable laptop computers in which all computer functions are incorporated into a small case and in which space is limited.

The cursor control of the invention is advantageous because it is operated with smaller operating movements than a mouse. The smaller movements are possible because the cursor control of the invention can use position addressing relative to a precise zero return position. Thus, the mechanism of the invention permits a low friction and damping-free zero position resetting operation, without undesirable oscillations of the cursor control.

Apart from providing relative addressing of the cursor by the deflection of the cursor control device, it is also possible to derive a relative cursor speed in relation to deflection. The speed of the cursor on the screen can thus be increased with increasing distance of the control element from the zero position. It is in such an application that a precise return to a zero position is important. Failure to provide such a reliable and precise return would result in undesirable and continuous drift of the cursor around the screen and would make cursor control very difficult. The cursor device of the invention avoids such difficulties.

The invention may be embodied in other specific forms without departing from its spirit or essential characteristics. The present embodiments are, therefore, to be considered in all respects as illustrative and not restrictive. The scope of the invention is indicated by the claims rather than by the foregoing description. All changes which come within the meaning and range of equivalents of the claims are intended to be embraced therein.

We claim:

1. An improved cursor control device of a type wherein a positioning element is moved from a zero rest position along coordinate axes of a base plate to define a relative change of position for the cursor of a display screen and wherein the control element is automatically returned to its zero rest position when an actuating force is removed, a coordinate generator for each axis of movement providing signals indicative of the position of the positioning element and the cursor in each axis of movement, the improvement comprising:

at least one stop element for each coordinate generator of the base plate having stop faces which define two stop positions between which the positioning element is disposed in said zero rest position;

a plurality of webs, said webs being displaceable along each coordinate axis for engaging said stop faces associated with each of the stop positions, and said positioning element being disposed between said webs and including an actuating key means and an actuating pin for holding the actuating key means, the web spacing at the stop positions in the zero rest position being equal to the width of said positioning element;

a cover means for defining an opening for the passage of said actuating pin which is smaller than the area of movement of the actuating pin;

said cover means including a first cover arranged in a first top plane and having an opening which in a first coordinate axial direction has a size adequate to receive said actuating pin and in a second coordinate axial direction has a length which is shorter than the length of travel of the actuating pin;

a second intermediate cover disposed in a second plane below the first plane with guides which permit movement of said first cover relative to the second intermediate cover in the second coordinate axial direction, the intermediate cover having an opening over which the first cover moves which in the first coordinate direction is smaller than the width of the first cover part and in the second coordinate direction is at least as long as the length of the full displacement of the actuating pin in said second direction but smaller than the length of the first cover part;

a third cover arranged in a lower plane below the second plane including two separate edge portions displaceable in the first coordinate axial direction and having a free space therebetween which corresponds to the area of the region over which the actuating pin can move in either coordinate direction;

the two separate edge portions of said third cover leaving a rectangular opening which in the second coordinate axial direction is smaller than the extent of the second intermediate cover but larger than the length of the possible displacement of the actuating pin in said direction and which in the first coordinate axial direction with maximum spacing is larger than the required displacement of the actuating pin and smaller than the coverage of the second intermediate cover in said direction; and studs disposed on the second intermediate cover and mating slots disposed on the third lower cover for engaging said studs to contain said edge portions upon displacement of the second intermediate member.

2. The cursor device of claim 1, further including springs disposed at opposite outer edges of said second intermediate cover for engaging said edge portions and maintaining a maximum spacing of said edge portions.

3. An improved cursor control device of a type wherein, in response to an actuating force, a positioning element is moved from a zero rest position relative to coordinate axes of a base plate to define a relative change of position of the cursor of a display screen, and wherein the positioning element is automatically returned to its zero rest position when the actuating force is removed, a coordinate generator for each axis of movement providing signals indicative of the position of the positioning element and the cursor in each axis of movement, the improvement comprising:

first and second carriage means movable in orthogonal directions with respect to said base plate;

an actuating pin for moving said positioning element;

first rail means disposed on said base plate for guiding linear sliding movement of said first carriage means;

grooves formed on said first carriage means for allowing the first carriage means to slide along said first rail means;

second rail means disposed on said first carriage means for guiding linear sliding movement of said positioning element in a direction orthogonal to the direction of sliding movement of the first carriage means;

grooves formed on said positioning element for allowing the positioning element to slide along said second rail means of said first carriage means;

first and second zero stop means, each stop means including two separate movable webs, separate barrier surfaces and a spring means for connecting and biasing said webs against said barrier surfaces;

the webs of said first zero stop means disposed in the plane of said first carriage means on opposite sides thereof and having grooves for engaging and sliding along said first rail means of said base plate;

the webs of said second zero stop means disposed in the plane of said positioning element on opposite sides thereof and having grooves for engaging and sliding along said second rail means of said first carriage means; and said second carriage means having a cutout and being positioned above said positioning element with said actuating pin passing through said cutout and supporting a control element.

4. The cursor device of claims 1, 2 or 3, further including a supporting keyboard.

5. The cursor device of claim 3, wherein the spacing of the webs of the second zero stop means in the zero rest position is equal to the width of said positioning element.

6. The cursor device according to claim 3, further including at least one light lineal means connected to said positioning element and means for optoelectronically converting movement of the lineal to electrical pulses.

7. The cursor device of claim 6, further including a carriage for mounting said at least one light lineal for guided movement with respect to said positioning element.

8. The cursor device of claim 3, wherein said control element includes four key switches which are each associated with a particular coordinate direction.

9. The cursor device of claim 2, further including key switches disposed on the upper side of said control element.

10. The cursor device of claim 9, wherein at least some of said key switches are disposed on the sides of said control element.

11. The cursor device of claim 3, further including key switches disposed at side edges of said control element.

12. The cursor device of claim 3, wherein said actuating pin has a longitudinal bore for passing control wires.

* * * * *

UNITED STATES PATENT AND TRADEMARK OFFICE
CERTIFICATE OF CORRECTION

PATENT NO. : 5,252,952
DATED : October 12, 1993
INVENTOR(S) : Manfred Frank et al.

It is certified that error appears in the above-indentified patent and that said Letters Patent is hereby corrected as shown below:

Column 10: In Claim 9, line 1, delete "2" and substitute --3-- therefor.

Signed and Sealed this

Thirtieth Day of August, 1994

Attest:

Attesting Officer

BRUCE LEHMAN

Commissioner of Patents and Trademarks